Figure 1:
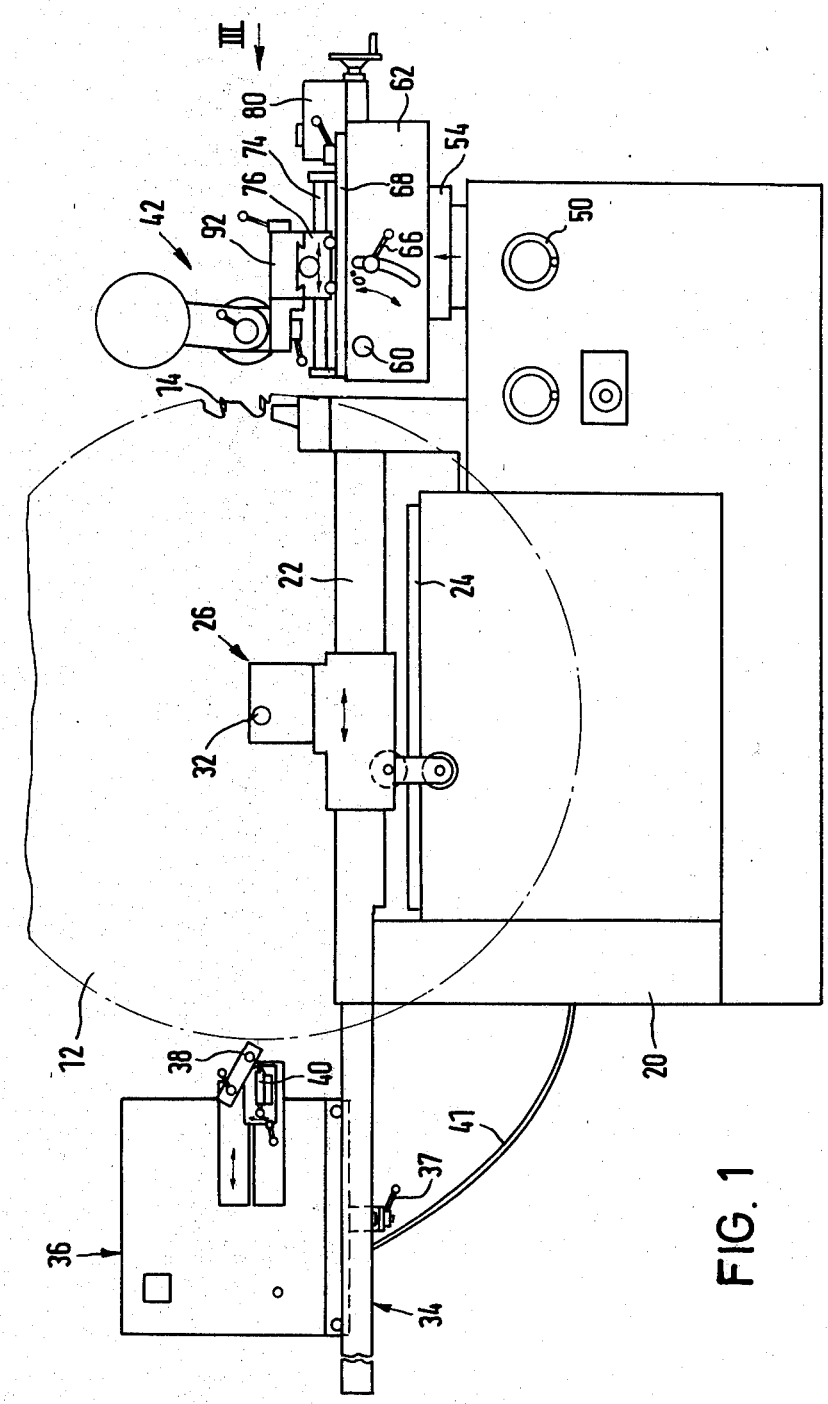

United States Patent [19]

Beck et al.

[11] 4,366,728
[45] Jan. 4, 1983

[54] MACHINE FOR REPAIRING HARD ALLOY TIPPED SAW BLADES

[75] Inventors: Ernst Beck, Maselheim; Peter Lenard, Biberach an der Riss, both of Fed. Rep. of Germany

[73] Assignee: Vollmer Werke Maschinenfabrik GmbH, Fed. Rep. of Germany

[21] Appl. No.: 190,451

[22] Filed: Sep. 24, 1980

[30] Foreign Application Priority Data

Oct. 8, 1979 [DE] Fed. Rep. of Germany ....... 2940730

[51] Int. Cl.³ .............................................. B23D 63/00
[52] U.S. Cl. ................. 76/25 R; 51/111 R; 51/80 R; 76/112; 76/80; 76/41
[58] Field of Search .................. 76/25 R, 112, 79, 80, 76/41, 228/6 R, 8, 44.1 R, 49, 185, 212; 51/54, 55, 111 R, 80 R, 33 R, 225

[56] References Cited

U.S. PATENT DOCUMENTS

| | | | |
|---|---|---|---|
| 2,958,240 | 11/1960 | Segal | 76/112 |
| 3,616,711 | 11/1971 | Daggett | 76/40 |
| 3,960,310 | 6/1976 | Nussbaum | 76/25 R |
| 4,098,149 | 7/1978 | Wright | 76/40 |

*Primary Examiner*—Roscoe V. Parker
*Attorney, Agent, or Firm*—Eyre, Mann, Lucas & Just

[57] ABSTRACT

A machine for the repair of alloy-tipped saw blades is provided. According to the invention, a damaged circular saw blade can be completely repaired at one location. The saw blade is clamped in the machine. Brazing and grinding tools are positioned for repair of the clamped saw blades.

8 Claims, 10 Drawing Figures

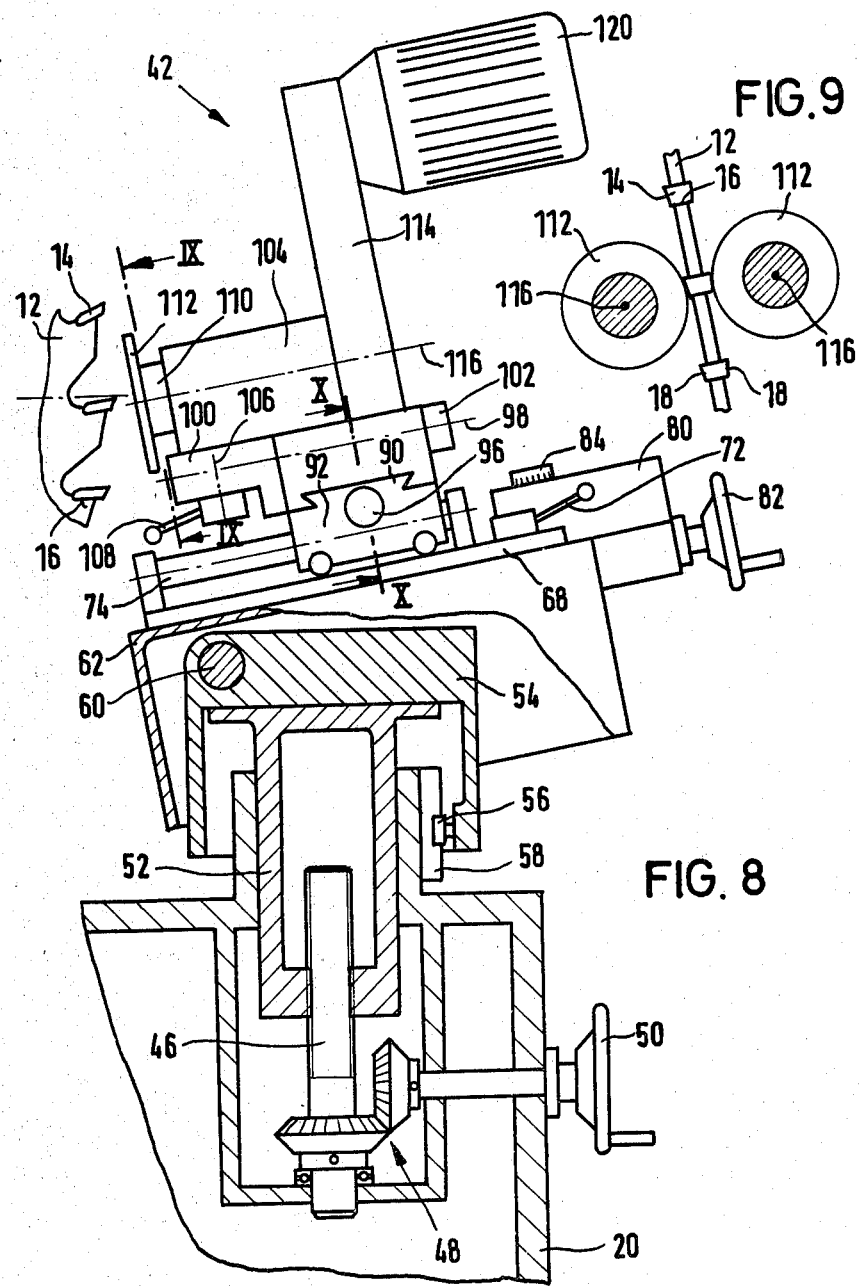

MACHINE FOR REPAIRING HARD ALLOY TIPPED SAW BLADES

The invention concerns a machine for repairing hard alloy tipped saw blades in which a saw blade support and a brazing tool are arranged on a frame for brazing hard alloy plates on prepared plate seats of a saw blade.

In cutting metals, particularly steel, hard alloy tipped circular saw blades are exposed to heavy stresses on the hard alloy plates. Frequently, individual plates become damaged and must be repaired. For this, the following operations have hitherto been required:
  (a) Brazing out the damaged hard alloy plates with a welding torch or a brazing tool,
  (b) Reconditioning the plate seat with a file or a special grinding machine,
  (c) Brazing on new hard alloy plates with the welding torch or the brazing tool,
  (d) Regrinding the newly brazed plates on the flanks of the teeth and, if necessary, on the periphery of the saw blade to match the remaining hard alloy plates.

Unless they are performed in a complicated and imprecise way by hand, these various operations necessitate repeated transfer of the saw blade to centering devices of the various machines required. This is time-consuming, especially in the case of fairly large circular saw blades for cutting steel, which have a diameter of up to some 2200 mm and therefore can only be moved with hoisting equipment.

An object of the invention, therefore, is to improve a machine of the type described above and as it is disclosed in German Patent Application No. P 27 51 413.2 filed Nov. 17, 1977, such that, in addition to the operations (a) and (c) described above, at least operation (d) may be performed on it mechanically and performance of operation (b) is at least made easier.

This object is accomplished pursuant to the invention in that on the frame, spaced from the brazing tool, are arranged a pair of clamping jaws for holding the saw blade and two flank grinding tools for simultaneous grinding of both flanks of a hard alloy plate brazed on a plate seat.

A damaged circular saw blade can be repaired on the machine pursuant to the invention without ever having to be moved about. For all the operations described above, the saw blade is placed on the blade support and then only needs to be turned on the latter in order for all teeth having a damaged hard alloy plate first to be brought into the working range of the brazing tool for brazing off the damaged hard alloy plate, reconditioning the plate seats, brazing on new plates then—again with the brazing tool—and finally grinding these plates on the flanks of the teeth and, if necessary, on the periphery of the teeth as well by using the two flank grinding tools.

Since, in reconditioning plate seats, experience indicates that usually only small quantities of residual brazing material must be removed, this operation may be performed by hand with a file, as hitherto known. This is done on the machine according to the invention preferably in the vicinity of the clamping jaws where, on the one hand, the saw blade is held securely and therefore does not tend to vibrate and, on the other, owing to the distance of the jaws from the brazing tool, there is no danger of touching hot parts of the brazing tool and thereby risking a burn.

With respect to the saw blade support, the clamping jaws and flank grinding tools are preferably arranged diametrically opposed. With this arrangement there is very little danger of the operator's accidentally touching the brazing tool and moreover heat radiation and brazing fumes are kept away from the flank grinding tools. The two flank grinding tools are preferably connected together by an intermediate member which is displaceable, by means of a control drive, in the plane of the saw blade. It is thereby made possible to impart simultaneous and equal feed motions to the two flank grinding tools. For this purpose each of the two flank grinding tools is preferably arranged on a radial slide which is connected with the intermediate member by a strap and carried on a radial guide, which guide in its normal position extends parallel to the saw blade and is capable of pivoting out of this normal position about a pivot shaft arranged at right angles to the radial guide and parallel to the saw blade. Thus the two flank grinding tools may receive their feed and withdrawal motions from the common control drive even when the directions of motion of the two tools corresponding to the clearance angles that they are to grind are not parallel to one another.

On each of the two radial slides is preferably arranged a transverse slide displaceable at right angles to the radial guide and to its pivot shaft, on which transverse slide the respective flank grinding tool is capable of rotary adjustment between a work position for peripheral grinding about a rotary shaft parallel to the said pivot shaft. It is thereby made possible to grind the flanks of the hard alloy plates forming the actual tooth flanks, selectively with the flat front face or with the circularly cylindrical peripheral surface of a grinding disk of the respective flank grinding tool. Both grinding processes are customary, wherefore in repair work it is desirable to use one or the other process selectively, according to how the hard alloy plates not requiring replacement have been ground.

The two flank grinding tools are preferably supported on a common table which is capable of tilting about a tilt shaft normal to the saw blade. It is thereby possible to adjust the flank-grinding tools according to the required rake angle even when they are used only for grinding the flanks of the teeth.

The table is preferably seated on a support which is movably carried on the frame of the machine for movement tangential to the saw blade.

In a preferred embodiment of the invention, in addition to the two flank grinding tools a plate-seat grinding tool is supported on the table. It is thereby made possible to grind the plate seats mechanically on one and the same machine on which the brazed-on hard-alloy plates are later also ground. Arrangement of the plate seat grinding tools on the same table that also bears the flank grinding tools results in the additional advantage that the adjustment of the table required for flank grinding may likewise be used for grinding of the plate seats. The plate-seat grinding tool is preferably displaceable on a guide which in a working position extends normal to the saw blade and is movable into a resting position in which the work space of the plate-seat grinding tool is free for the flank grinding tools. This results in a compact design and arrangement of all grinding tools and their guides.

Figure 3:
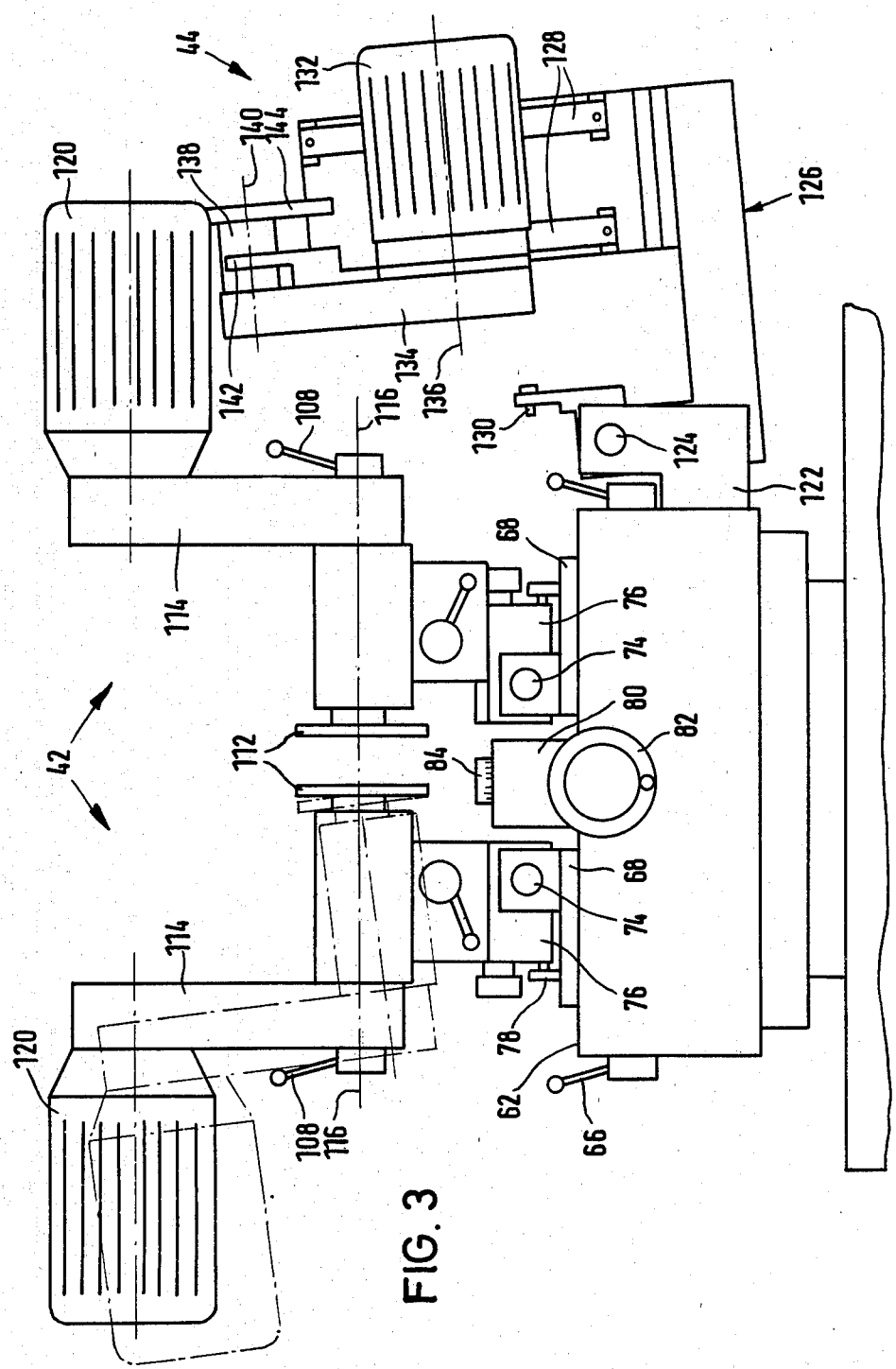
Figure 4:
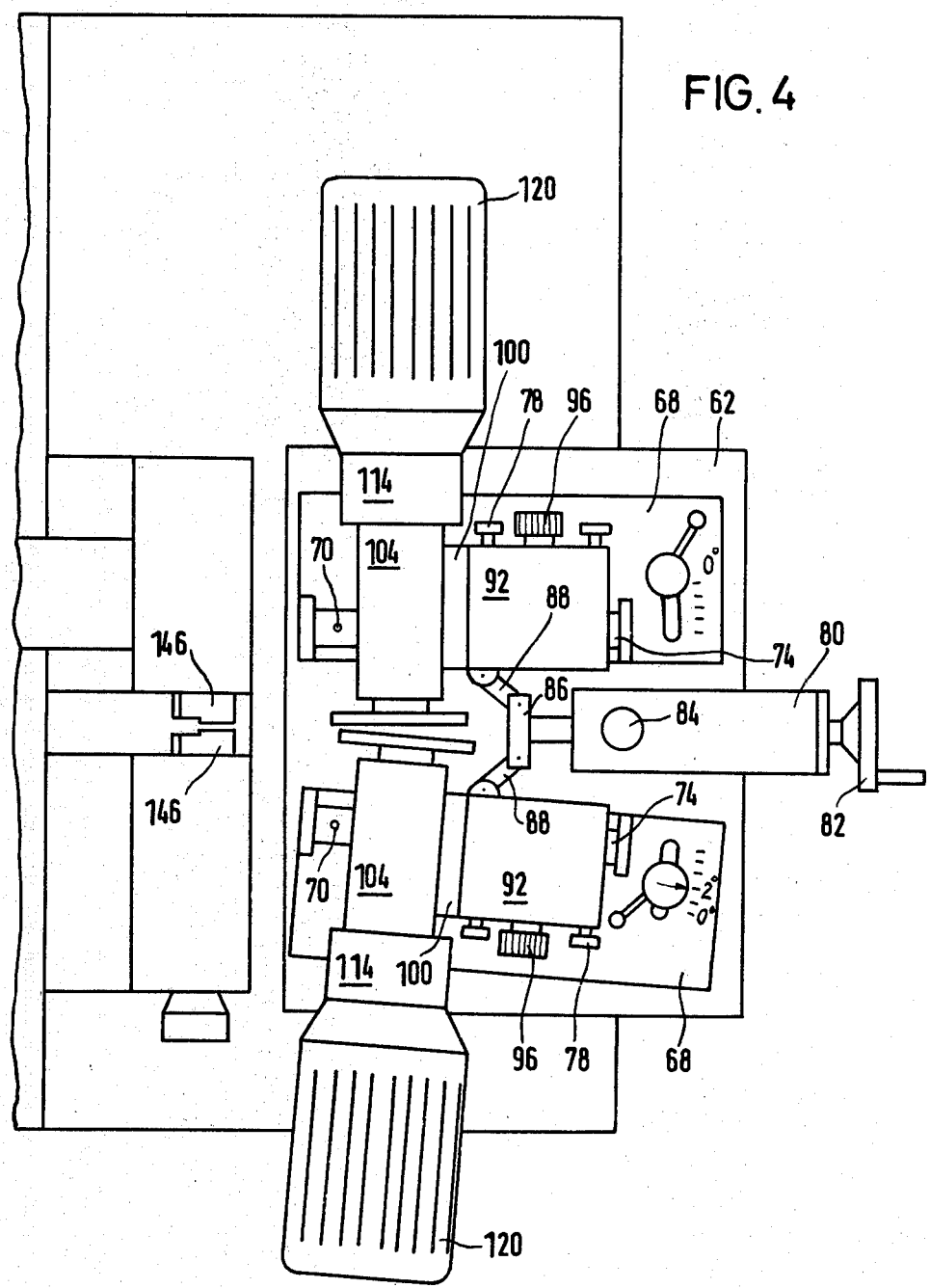
Figure 5:
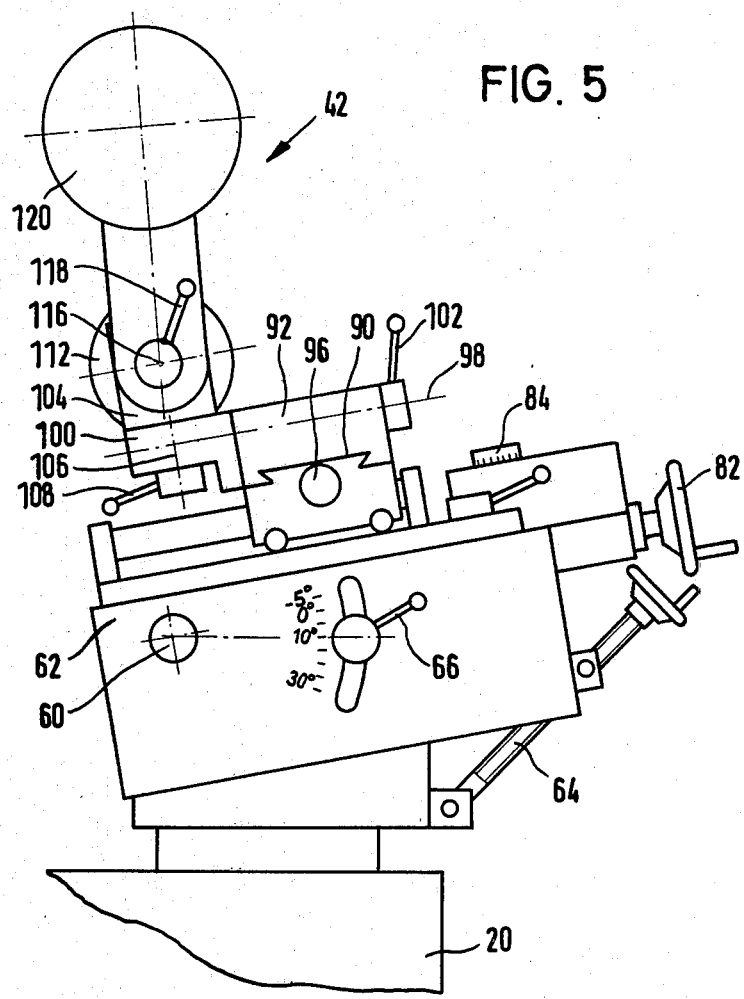
Figure 6:
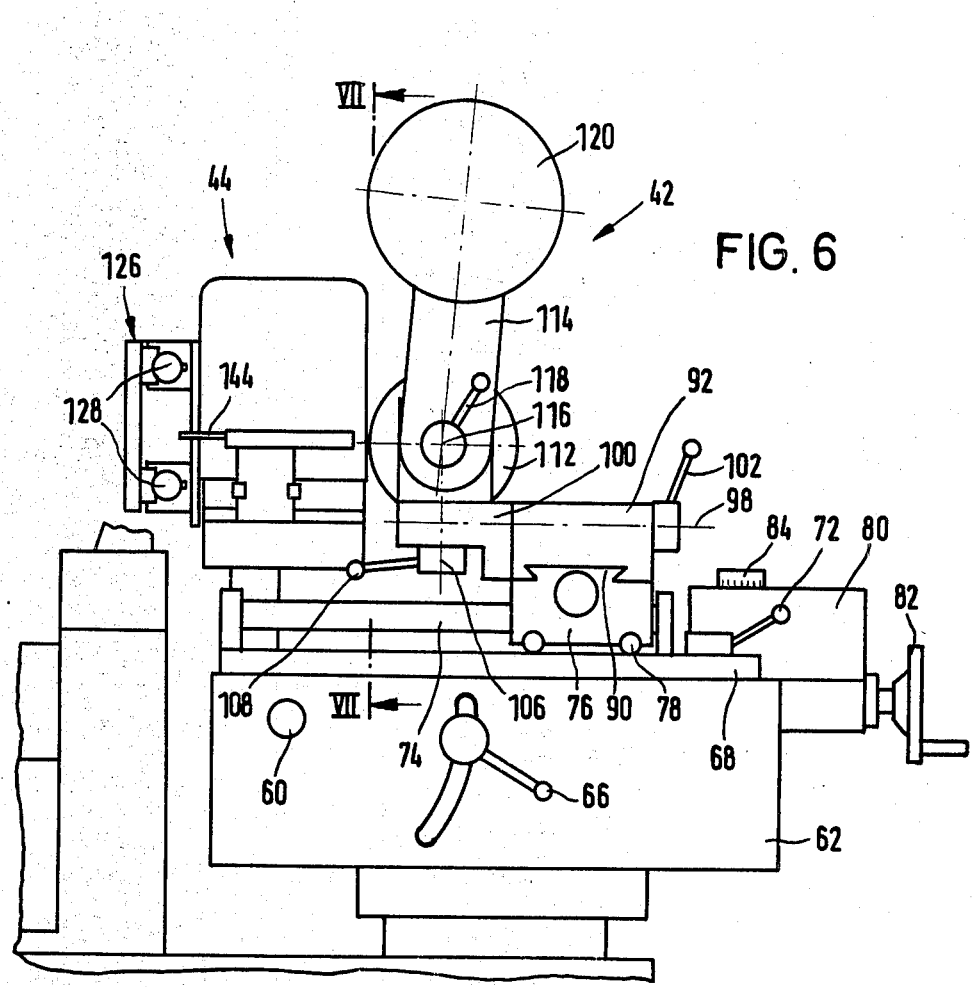
Figure 7:
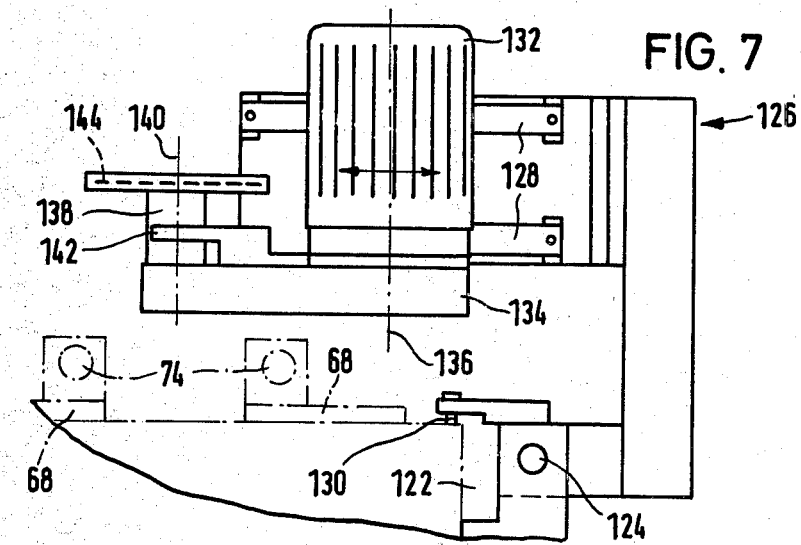

It is advantageous, in this connection, if the guide of the plate seat grinding tool is capable of swinging out of the way about a shaft extending parallel to the direction of displacement of the intermediate member.

An example of the invention is explained below with the aid of schematic drawings, in which FIG. 1 shows a front view of a machine pursuant to the invention, FIG. 2, a respective top view, in the right-hand part of which, however, the two flank grinding tools and the plate seat grinding tool are reversed in comparison to FIG. 1, FIG. 3, a side view, in the direction of the arrow III in FIG. 1, with both flank grinding tools in working positions for face grinding and the plate seat grinding tool in resting position, FIG. 4, a top view pertinent to FIG. 3 in which the plate seat grinding tool has been omitted, FIG. 5, the right-hand part of FIG. 1 in altered working position, FIG. 6, the right-hand part of FIG. 1 with the plate seat grinding tool in working position, FIG. 7, section VII—VII in FIG. 6, FIG. 8, section VIII—VIII in FIG. 2, but with no plate seat grinding tool, FIG. 9, partial section IX—IX in FIG. 8 and FIG. 10, partial section X—X in FIG. 8.

The machine represented solves the problem of brazing off, on a circular saw blade which for the sake of simplicity is designated as saw blade 12, damaged hard alloy plates 14, cleaning and levelling their plate seats 16, brazing on new hard alloy plates 14 and grinding at least their flanks 18.

The machine has a frame 20, on which are attached a horizontal guide bar 22 of circular cross section and, parallel thereto, a guide rail 24. On the guide bar 22 is movably carried a saw blade support 26, from which an arm 28 extends essentially horizontally and transverse to the guide bar 22. At the end of the arm 28 are supported, parallel to one another, two rollers 30, one of which runs on the upper side and the other on the lower side of the guide rail 24, so that the saw blade support 26 is prevented from turning about the guide bar 22. On the saw blade support 26 is attached a horizontal trunnion 32 on which the saw blade 12 is supported such that it stands in a perpendicular plane parallel to the guide bar 22.

Figure 2:
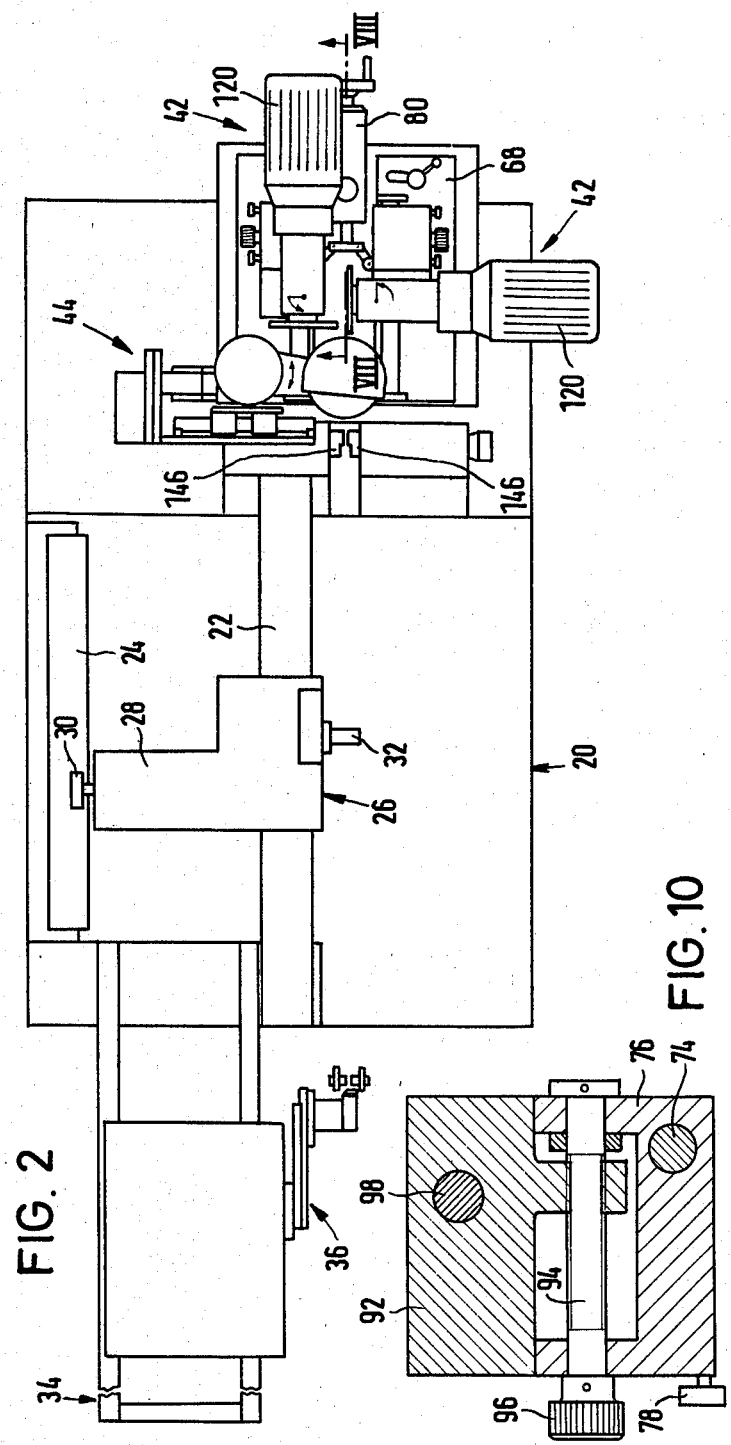

To the guide for the saw blade support 26, consisting of the guide bar 22 and the guide rail 24, is joined in the same plane, at the left in FIGS. 1 and 2, a guide 34 on which is movably supported a brazing device 36 capable of being clamped with a toggle 37. The brazing device 36 has two jaws 38, which are capable of pressing against the saw blade 12 from either side, as well as a rest 40 for a hard alloy plate 14. The jaws 38, on the one hand, and the rest 40, on the other, are each connected by way of a line 41 to one pole of a direct current source. Details of a brazing device suitable for the machine represented are illustrated and described in German Patent Application No. P 27 51 413.2 filed Nov. 17, 1977.

With respect to the trunnion 32, two flank grinding tools 42 and a seat grinding tool 44 lie diametrically opposed to the jaws 38 and the rest 40. The two flank grinding tools 42 are arranged normally symmetrical in relation to the plane of the saw blade 12; departures from the symmetrical arrangement are shown in FIGS. 2, 3 and 4 only for the purpose of illustrating possibilities for displacement of the flank grinding tools 42. The flank grinding tools 42 accomplish the task, first of all, of grinding the flanks, i.e., the lateral boundary surfaces, of the hard alloy plates 14. In addition, the flank grinding tools 42 may be used for other grinding tasks such as, for example, for beveling the plates 14. The seat grinding tool 44 has the function, after a damaged plate 14 has been brazed off, of grinding the plate seat 16 thereof, so that a new hard alloy plate 14 may then be brazed on solidly in the correct position.

The base on which the flank grinding tools 42 and the seat grinding tool 44 are adjustably arranged is described below:

In the part of the frame 20 on the right in FIGS. 1 and 2, a vertical threaded spindle 46 is according to FIG. 8 seated in a fixed axial position and connected by way of a cone-pulley drive 48 with a handwheel 50 which is disposed according to FIG. 1 at the front side of the frame 20 and has been placed in the plane of the drawing of FIG. 8 for the sake of clearer illustration only. The vertical threaded spindle 46 is threaded into a vertical cylindrical support 52 which is vertically displaceable in the frame 20 and may thus be vertically displaced by turning of the handwheel 50. On the support 52 is attached a cap 54. On the cap 54 rests a roller 56 which runs in a vertical guide 58 on the frame 20 and thereby prevents the support 52, together with the components arranged thereon, from turning about the threaded spindle 46.

On the cap 54 a table 62 is supported in a manner enabling tilting about a horizontal tilt shaft 60 normal to the plane of the saw blade 12. The table 62 is shown in FIGS. 5 and 8 in a tilting position in which it is tilted by 10° from the horizontal and so is adapted to the rake angle of the teeth of the saw blade 12, which according to FIG. 8 likewise amounts to 10°. In the other figures, the table 62, in contrast, is shown in its normal horizontal position, which it assumes when according to FIG. 1 a saw blade 12 having a rake angle of 0° is to be processed. For adjusting the table 62 to the desired rake angle, there is provided according to FIG. 5 an inclined threaded spindle 64 which connects the table 62 in an articulated manner with the cap 54. In the desired position of adjustment, the table 62, as is likewise seen, for example, in FIG. 5, may be clamped with a toggle 66.

On the table 62, two plates 68 are each pivotally supported, about a pivot shaft 70. The two pivot shafts 70 extend parallel to one another at right angles to the plane of the table, i.e., vertically, when the table 62 is set at a rake angle of 0°. The ability of the plates 68 to pivot about their pivot shafts 70 serves according to FIG. 4 for adjustment of the flank grinding tools 42 to the desired radial clearance angle of the flanks of the hard alloy plates 14. One of the two flank grinding tools 42 is adjusted according to FIG. 4 to a radial clearance angle of 0° and the other to a radial clearance angle of 2°. In practice, however, both flank grinding tools 42 are from time to time adjusted to like radial clearance angles, so that, as mentioned, they always work in a symmetrical arrangement with respect to the saw blade 12. A toggle 72 is provided for each of the plates 68 for clamping them in the desired pivot position. To each of the two plates 68 is attached a radial guide 74, the designation of which is derived from the fact that in adjustment of the table 62 to a rake angle of 0° and in adjustment of the respective plate 68 to a radial clearance angle of 0° this radial guide extends essentially radially with respect to the saw blade 12. Each of the two radial guides 74 is formed of a cylindrical bar and each carries a radial slide 76, which in addition has rollers 78 resting on the respective plate 68 and is thereby prevented from turning about the respective radial guide 74.

Between the two plates 68 there is attached to the table 62 a hydraulic adjusting drive 80, which imparts simultaneous and equal motions to the two radial slides 76 along the radial guides 74. The adjusting drive 80 has a fast speed and a creeping speed. The path to be covered at high speed is adjustable by a handwheel 82. A rotary knob 84 is provided for adjusting the path which is then covered in the creeping speed. The output member of the adjusting drive 80 is an intermediate member 86, which is articulatingly connected with each of the two radial slides 76 by a strap 88. This arrangement automatically adapts to the varying distances between the two radial slides 76 in tilted radial guides 74.

Each radial slide 76 has a transverse guide 90, which extends at right angles to the respective radial guide 74 and likewise at right angles to the respective pivot shaft 70. Along each transverse guide 90, a transverse slide 92 is displaceable by means of a threaded spindle 94 which is axially fixed in the respective radial slide 76, is turnable by hand by a rotary knob 96 and is bolted to the respective transverse slide 92. See FIG. 10.

On each transverse slide 92 is arranged an inclined adjusting shaft 98 parallel to the respective radial guide 74, on which shaft a base 100 is supported and clamped by means of a toggle 102. The possibility of an inclined position, indicated by dot-and-dash lines in FIG. 3 for the flank grinding tool 42 arranged there at the left, means that the respective flank grinding tool 42 may be adjusted to any desired tangential clearance angle of the tooth flank to be ground. In operation the symmetry of the two flank grinding tools 42 is likewise constantly maintained with reference to this adjustment.

On each of the two bases 100 is supported a bearing housing 104 capable of rotary adjustment about a vertical rotary shaft 106 and clamped by means of a toggle 108. In each of the two bearing housings 104 is supported a grinding spindle 110, to which is attached a grinding disk 112. In addition, on each bearing housing 104 is supported a gear housing 114 capable of pivoting adjustment about the geometrical axis, designated below as grinding spindle shaft 116, of the respective grinding spindle 110 and grinding disk 112 and clamped by means of a toggle 118. Each of the two gear housings 114 contains a belt drive which connects the respective grinding spindle 110 with a motor 120.

The capacity for rotary adjustment of each bearing housing 104 in relation to the respective base 100 enables the respective grinding disk 112 to act selectively by either its flat front face or its cylindrical peripheral surface on the respective flanks 18 of the hard alloy plates 14. Face grinding is generally to be preferred, as it results in level flanks 18 which do not alter their clearance angle when the rake surfaces, i.e. the surfaces of the hard alloy plates 14 pointed forward in the direction of rotation of the saw blade 12, are reground. Peripheral grinding operations, in contrast, are generally performed with the flank grinding tools 42 only when the saw blade 12 still has intact hard-alloy plates 14 which already have a ground peripheral section.

To illustrate the effect of a turn of 90° about the rotary shaft 106, in FIG. 2 one flank grinding tool 42, the one adjacent to the lower edge of the drawing, is represented in a position for peripheral grinding. In practice, however, the two flank grinding tools 42 are from time to time adjusted alike, i.e., either both for face grinding or both for peripheral grinding. The space occupied by the respective motor 120 is variable according to which of these two adjustments is selected. Thus it may be seen for example, in FIG. 1 that, in the adjustment for face grinding, the motors 120 are preferably swung somewhat away from the saw blade 12. When the two flank grinding tools 42 are set for peripheral grinding, in contrast, it is preferable to swing the two motors 120 away from one another so that they cannot touch one another. This is made possible by providing pivot adjustment of the gear housing 114 about the grinding spindle shafts 116.

Now that the flank grinding tools 42 have been described in all essential details, there remains to be described the seat grinding tool 44, which is connected with the table 62 as described below.

To the table 62 is attached a bearing block 122 which has a bearing shaft 124 extending parallel to the plane of the table 62 and at right angles to the tilt shaft 60 of the latter. On the bearing shaft 124 is supported a supporting structure 126 in such fashion that it is capable of swinging out of a working position according to FIGS. 3, 6 and 7 into a resting position illustrated in FIG. 3. To the supporting structure 126 are attached two parallel guide bars 128, which in the working position extend parallel to the tilt shaft 60 of the table 62, i.e., horizontal and normal to the plane of the saw blade 12. It is important that these conditions be closely observed; therefore the operating position is adjustable by a stop screw 130 in the supporting structure 126.

A motor 132 and a gear housing 134 attached thereto are displaceable along the guide bars 128. The gear housing 134 is pivotally attached to the housing of the motor 132 for pivotal adjustment about the shaft 136 of the motor and bears a bearing housing 138, which is adjustably clamped along a spindle shaft 140 parallel to the shaft 136 of the motor in a tension device 142 formed on the gear housing 134. The spindle shaft 140 is the geometrical axis of a vertically-operating grinding spindle, not visible in the drawings. The grinding spindle is connected with the motor 132 through a belt drive arranged in the gear housing 134 and bears a grinding disk 144.

In the direct vicinity of the spot at which the flank grinding tools 42 and the seat-grinding tool 44 work, the saw blade 12 is clamped in between two hydraulically-operated jaws 146.

What is claimed is:

1. A machine for repairing hard-alloy-tipped saw blades having plates brazed on prepared plate seats of a saw blade, said machine comprising:
   (a) a frame;
   (b) a saw blade support on said frame;
   (c) a pair of clamping jaws on said frame for holding said saw blade seated on said saw blade support;
   (d) at least two flank-grinding tools for simultaneously grinding both flanks of one of said plates;
   (e) at least two radial guides;
   (f) at least two radial slides, one each of said radial slides carried respectively on each said radial guide;
   (g) each of said flank-grinding tools being arranged respectively on one of said radial slides;
   (h) each said radial guide being adapted for pivoting adjustment out of a normal position wherein the radial guide extends parallel to a saw blade seated on said saw blade support and about a pivot shaft disposed at right angles to the radial guide and parallel to the saw blade;

(i) at least two transverse slides, each said transverse slide being disposed, respectively, on said radial slides, each transverse slide being displaceable at right angles to the radial guide and its pivot shaft, and a rotary shaft on said transverse slide, said rotary shaft being parallel to the corresponding pivot shaft, each said flank-grinding tool being adapted for rotary adjustment on said rotary shaft between a working position for face grinding and a work position for peripheral grinding of said plates.

2. The machine of claim 1 wherein said flank-grinding tools are supported on a common table which is adapted for tilting about a tilt shaft normal to the saw blade.

3. The machine of claim 2 wherein the table is seated on a support which is movably carried on the frame of the machine for movement tangential to the saw blade.

4. The machine according to claim 2 or 3, further comprising a plate seat grinding tool disposed on said table.

5. The machine of claim 4 wherein the plate seat grinding tool is movable on a guide which in a working position extends normal to the saw blade and is movable into a resting position in which the work space of the plate seat grinding tool is free for the flank grinding tools.

6. The machine of claim 5 wherein the guide of the plate seat grinding tool is adapted for swinging out of the way about a shaft extending parallel to the direction of displacement of the intermediate member.

7. A machine for repairing hard-alloy-tipped saw blades comprising:
   (a) a frame;
   (b) a saw blade support on said frame;
   (c) a brazing tool on said frame for brazing plates on prepared plate seats of a saw blade seated on said saw blade support;
   (d) a pair of clamping jaws on said frame for holding said saw blade;
   (e) at least two flank-grinding tools for simultaneously grinding both flanks of one of said plates;
   (f) said pair of clamping jaws and said at least two flank-grinding tools being spaced from said brazing tool;
   (g) an intermediate member for connecting together said at least two flank-grinding tools, said intermediate member being displaceable in the plane of a saw blade seated on said saw blade support, and a control drive for moving said intermediate member;
   (h) at least two radial guides;
   (i) at least two radial slides, one each of said radial slides carried respectively on each said radial guide, said radial slides being connected to said intermediate member;
   (j) each of said flank-grinding tools being arranged respectively on each of said radial slides; and
   (k) each said radial guide being adapted for pivoting adjustment out of a normal position wherein the radial guide extends parallel to a saw blade seated on said saw blade support and about a pivot shaft disposed at right angles to the radial guide and parallel to the saw blade; and
   (l) at least two transverse slides, each said transverse slide being disposed, respectively, on said radial slides, each said transverse slide being displaceable at right angles to the radial guide and its pivot shaft, and a rotary shaft on said transverse slide, said rotary shaft being parallel to the corresponding pivot shaft, each said flank-grinding tool being adapted for rotary adjustment on said rotary shaft between a working position for face grinding and a work position for peripheral grinding of said plates.

8. A machine for repairing hard-alloy-tipped saw blades comprising:
   (a) a frame;
   (b) a saw blade support on said frame;
   (c) a brazing tool on said frame for brazing plates on prepared plate seats of a saw blade seated on said saw blade support;
   (d) a pair of clamping jaws on said frame for holding said saw blade;
   (e) at least two flank-grinding tools for simultaneously grinding both flanks of one of said plates;
   (f) said pair of clamping jaws and said at least two flank-grinding tools being spaced from said brazing tool;
   (g) said flank-grinding tools are supported on a common table which is adapted for tilting about a tilt shaft normal to the saw blade;
   (h) the table is seated on a support which is movably carried on the frame of the machine for movement tangential to the saw blade;
   (i) a plate seat grinding tool disposed on said table; and
   (j) the plate seat grinding tool is movable on a guide which in a working position extends normal to the saw blade and is movable into a resting position in which the work space of the plate seat grinding tool is free for the flank grinding tools.

* * * * *